United States Patent
Ekman et al.

(10) Patent No.: US 9,449,593 B2
(45) Date of Patent: Sep. 20, 2016

(54) DETECTING NONLINEAR AMPLITUDE PROCESSING

(71) Applicant: Microsoft Technology Licensing, LLC, Redmond, WA (US)

(72) Inventors: Lars Anders Ekman, Stockholm (SE); Jesus de Vicente Peña, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 14/175,794

(22) Filed: Feb. 7, 2014

(65) Prior Publication Data

US 2015/0154977 A1 Jun. 4, 2015

(51) Int. Cl.
G10L 21/02 (2013.01)
G10K 11/175 (2006.01)
H04M 9/08 (2006.01)
G10L 21/0208 (2013.01)
G10L 25/03 (2013.01)

(52) U.S. Cl.
CPC ......... G10K 11/175 (2013.01); G10L 21/0208 (2013.01); H04M 9/082 (2013.01); *G10L 25/03* (2013.01); *G10L 2021/02082* (2013.01)

(58) Field of Classification Search
None
See application file for complete search history.

(56) References Cited

U.S. PATENT DOCUMENTS

| | | | |
|---|---|---|---|
| 6,687,235 B1 * | 2/2004 | Chu | H04B 3/23 370/286 |
| 7,027,592 B1 * | 4/2006 | Straussnigg | H04B 3/23 379/406.08 |
| 7,200,222 B2 * | 4/2007 | Laberteaux | H04M 9/082 379/406.05 |
| 7,236,929 B2 | 6/2007 | Hodges | |
| 7,424,109 B1 | 9/2008 | Yousseff | |
| 7,496,205 B2 * | 2/2009 | Kuhnel | H04R 25/70 381/60 |
| 8,364,480 B2 | 1/2013 | Sukkar | |
| 2003/0076949 A1 * | 4/2003 | Laberteaux | H04B 3/234 379/406.05 |
| 2009/0274315 A1 | 11/2009 | Carnes et al. | |
| 2010/0027820 A1 * | 2/2010 | Kates | G10L 25/00 381/312 |
| 2011/0093102 A1 * | 4/2011 | Aichner | H04M 9/082 700/94 |
| 2011/0293103 A1 | 12/2011 | Park et al. | |
| 2013/0287216 A1 | 10/2013 | Eriksson et al. | |
| 2015/0003606 A1 * | 1/2015 | Nemer | H04M 9/082 379/406.01 |

FOREIGN PATENT DOCUMENTS

WO WO-2013142695 9/2013

OTHER PUBLICATIONS

"International Search Report and Written Opinion", Application No. PCT/US2014/066491, Jan. 30, 2015, 10 Pages.

(Continued)

*Primary Examiner* — Brenda Bernardi
(74) *Attorney, Agent, or Firm* — Tom Wong; Micky Minhas

(57) ABSTRACT

Disclosed is a computer system comprising an audio processing module, an echo cancellation module and a control module. The audio processing module is configured to process an audio signal and output the processed audio signal to e.g. a speaker (or similar) of the system. The echo cancellation module is configured to cancel echo from an audio signal received via e.g. a microphone (or similar) of the system. The control module is configured to detect a condition indicative of nonlinear amplitude processing by the audio processing module and control said echo cancellation by the echo cancellation module based on the detected condition.

20 Claims, 9 Drawing Sheets

(56) References Cited

OTHER PUBLICATIONS

"Second Written Opinion Issued in PCT Application No. PCT/US2014/066491", Mailed Date: Nov. 10, 2015, 6 Pages.

"International Preliminary Report on Patentability Issued in PCT Application No. PCT/US2014/066491", Mailed Date: Feb. 19, 2016, 7 Pages.

* cited by examiner ium processing" filed Nov. 29, 2013 by Ekman et al., the disclosure of which is incorporate in its entirety.
DETECTING NONLINEAR AMPLITUDE PROCESSING

RELATED APPLICATIONS

This application claims priority under 35 USC §119 or §365 to Great Britain Patent Application No. 1321052.1 entitled "Detecting Nonlinear Amplitude Processing" filed Nov. 29, 2013 by Ekman et al., the disclosure of which is incorporate in its entirety.

BACKGROUND

Communication systems allow users to communicate with each other over a network. The network may be, for example, the Internet or public switched telephone network (PSTN). Audio signals can be transmitted between nodes of the network, to thereby allow users to transmit and receive audio data (such as speech data) to each other in a communication session over the communication system.

A user device may have audio input means such as a microphone that can be used to receive audio signals such as speech from a user. The user may enter into a communication session with another user, such as a private call (with just two users in the call) or a conference call (with more than two users in the call). The user's speech is received at the microphone, processed and is then transmitted over a network to the other users in the call. The user device may also have audio output means such as speakers for outputting audio signals to near-end user that are received over the network from a far-end user during a call. Such speakers can also be used to output audio signals from other applications which are executed at the user device, and which can be picked up by the microphone as unwanted audio signals which would disturb the speech signals from the near-end user.

As well as the audio signals from the user, the microphone may also receive other audio signals, such as background noise, which are unwanted and which may disturb the audio signals received from the user. The background noise can contribute to disturbance to the audio signal received at the microphone from the near-end user for transmission in the call to a far-end user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed is a computer system comprising an audio processing module, an echo cancellation module and a control module. The audio processing module is configured to process an audio signal and output the processed audio signal to e.g. speakers (or similar) of the system. The echo cancellation module is configured to cancel echo from an audio signal received via e.g. a microphone (or similar) of the system. The control module is configured to detect a condition indicative of nonlinear amplitude processing by the audio processing module and control said echo cancellation by the echo cancellation module based on the detected condition.

The computer system may be a single computer device (e.g. computer device housing or connected to both the audio input and audio output means), or comprise multiple computer devices (e.g. one computer device may output the signal to the speakers or similar, and another may receive the signal via the microphone or similar).

Also disclosed is a computer device comprising one or more processors. The one or more processors are configured to, for each of first and second audio signals—the second audio signal being a processed version of the first audio signal—determine a parameter of an amplitude distribution for that audio signal. The one or more processors are further configured to detect a condition indicative of said processing of the first signal comprising nonlinear amplitude processing. The detection comprises comparing the determined parameters for the first and second signals.

BRIEF DESCRIPTION OF FIGURES

For an understanding of the present subject matter and to show how the same may be put into effect, reference will now be made, by way of example, to the following drawings in which.

DETAILED DESCRIPTION

Embodiments will now be described by way of example only.

The present disclosure pertains to a detection process for detecting dynamic (dynamic range) compression (a form of nonlinear amplitude processing) by using histograms on audio (e.g. speech) sample values of an audio signal (these histograms being types of amplitude distribution for the audio signal). A histogram of a clean speech signal is discernibly different from a histogram of a dynamically compressed speech signal, and this difference is exploited to detect dynamic range compression.

Dynamic compression employed within an echo path being modelled for cancellation can cause the echo cancellation to fail and produce echo leaks. In embodiments, the detection process of the present disclosure may be employed in the context of acoustic echo cancellation as follows. When dynamic compression is detected, a more aggressive tuning of the echo canceller is effected which prevents most of the echo leaks. However, that aggressive tuning is not needed if dynamic compression is not detected; thus, when no dynamic compression is detected, a less aggressive tuning of the echo canceller is effected which avoids introducing an unnecessary degradation in that event.

Figure 1:
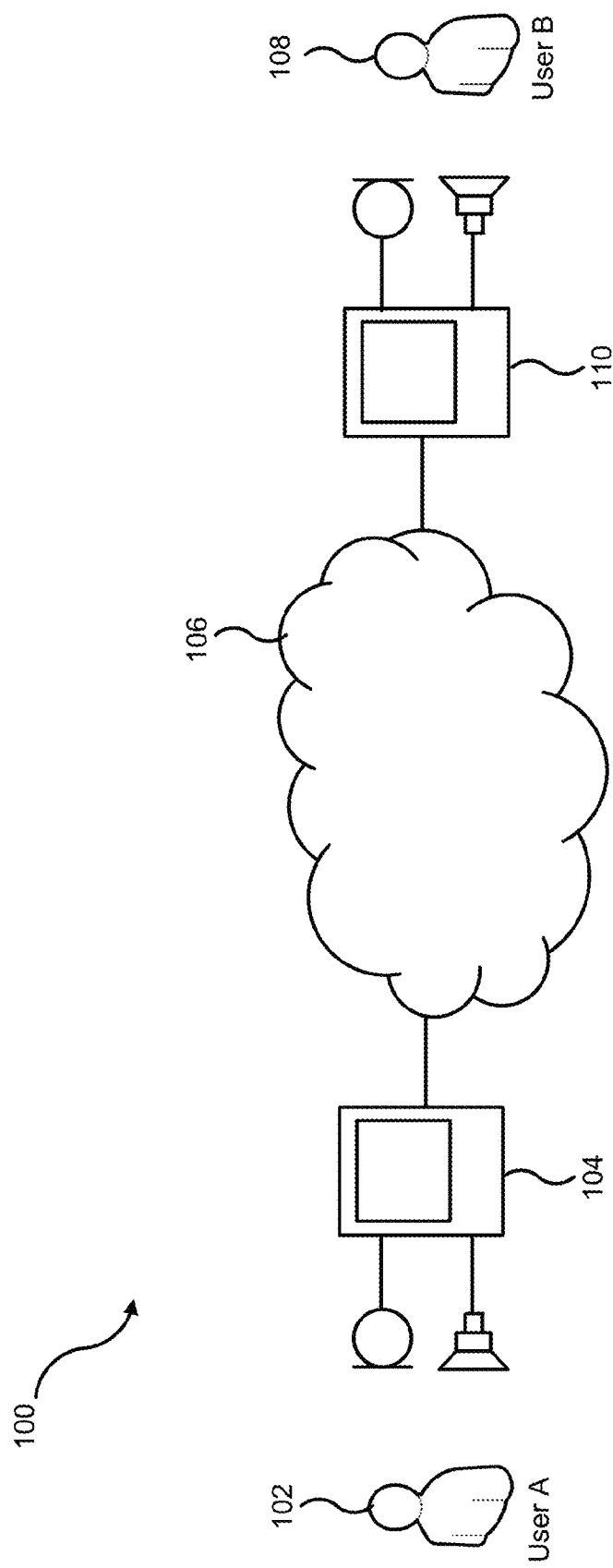
FIG. 1 shows a schematic illustration of a communication system.

FIG. 1 shows a communication system 100 comprising a first user 102 ("User A") who is associated with a first user device 104 and a second user 108 ("User B") who is associated with a second user device 110. In other embodiments the communication system 100 may comprise any number of users and associated user devices. The user devices 104 and 110 can communicate over the network 106 in the communication system 100, thereby allowing the users 102 and 108 to communicate with each other over the network 106. The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user device 104 is arranged to receive information from and output information to the user 108 of the user device 110. The user device 104 comprises output means such as a display and speakers. The user device 104 also comprises input means such as a keypad, a touch-screen, a microphone for receiving audio signals and/or a camera for capturing images of a video signal. The user device 104 is connected to the network 106.

The user device 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the user 102 to communicate over the network 106. The user devices 104 and 110 are endpoints in the communication system 100. FIG. 1 shows only two users (102 and 108) and two user devices (104 and 110) for clarity, but many more users and user devices may be included in the communication system 100, and may communicate over the communication system 100 using respective communication clients executed on the respective user devices.

Both the first user device 104 and a second user device 110 may perform acoustic echo cancellation. There are two main ways to achieve acoustic echo cancellation, one being echo subtraction and the other being echo suppression. Often these two approaches are combined.

The audio signal captured by the microphone of the first user device 104 is transmitted over the network 106 for playing out by the second user device 110. The microphone of the second user device 110 captures an echo of the audio signal that was transmitted by the first user device 104, if that echo is not fully cancelled, then the second user device 110 transmits it back to the first user device 104. That received signal is played-out through the speakers of the first user device 104 and, an echo is captured by the microphone of the first user device 104. If the echo canceller in the first user device 104 is not able to completely remove that echo, the echo signal is transmitted again to the second user device 110.

Devices typically have a dedicated audio signal processing module (such as a sound card) in addition to a local processor on the device. This audio signal processing module performs audio processing functions for the user device such as analogue to digital conversion (ADC) of audio signals captured at a microphone and digital to analogue conversion (DAC) of audio signals for playing out of a speaker. To use the audio signal processing module an operating system (OS) executed on the local processor on the device typically requires specific software. For example, to use a sound card, an OS typically requires a specific sound card driver (a software program that handles the data connections between the physical hardware of the sound card and the operating system).

It is common that this software (i.e. sound card drivers), and/or the hardware itself, introduce effects on the play out signal (i.e. the signal to be output from a speaker) in order to maximize the user experience (e.g. loudness enhancement effects included in the drivers). Those effects are achieved by signal processing modules on the audio signal processing module the functionality of which is unknown to applications (i.e. a communication client) executed on a local processor on the device that use the play out system available in the OS. For instance, it is common that hardware manufacturers include dynamic range compression in loudspeakers setups, e.g. in laptops.

Dynamic range compression (otherwise referred to as dynamic compression or simply compression) is often used in audio to reduce the volume of loud sounds or amplify the volume of quiet sounds by narrowing or "compressing" an audio signal's dynamic range (it is also employed, for instance, in scenarios such as broadcasting and sound reproduction where the quite parts might be inaudible otherwise, or the loud parts would get too loud). Downward compression reduces loud sounds over a certain threshold while quiet sounds remain unaffected, whilst upward compression increases the loudness of sounds below a threshold while leaving louder passages unchanged. Both downward and upward compression reduce the dynamic range of an audio signal.

Use of such compression is meant to enhance the user experience e.g. as the user is able to perceive a louder sound.

However, this creates challenges for echo cancelers as the compressors are nonlinear amplitude processing modules that are poorly modeled by traditional echo cancellation schemes. When compression is used on a communication device, it introduces a nonlinearity in an echo path. Echo cancellers are better suited to modelling linear distortions in the echo path and generally have problems accounting for nonlinear distortions that are present in the echo path. As a result, those nonlinear echo paths can lead to echo leaks or echo residuals in the signal.

Some operating systems include functionality for feeding back the signal that is going to be played out to the application executed on the local processor. Examples of operating systems including this functionality are Microsoft's Windows 7, 8, XP and Vista, and Windows Phone 8 operating systems. This signal that is fed back to the application executed on the local processor is referred to herein after as a "loopback signal". An echo canceller that uses the loopback signal does not need to model those nonlinear distortions that are introduced by that module and, therefore, echo leaks are not expected. However, the loopback signal is not available for all the operating systems. Examples of operating systems without this loopback functionality are Android and iOS operating systems. In the absence of a loopback reference signal, the echo canceler may fail and produce echo leaks.

In accordance with the present disclosure, a condition indicative of nonlinear amplitude processing in a modeled echo path is detected and an echo cancellation process controlled based on the detected condition. This reduces or eliminates such echo leaks which might otherwise occur e.g. on platforms where clients do not have access to a loopback signal (or similar) for use as a reference signal.

Figure 2:
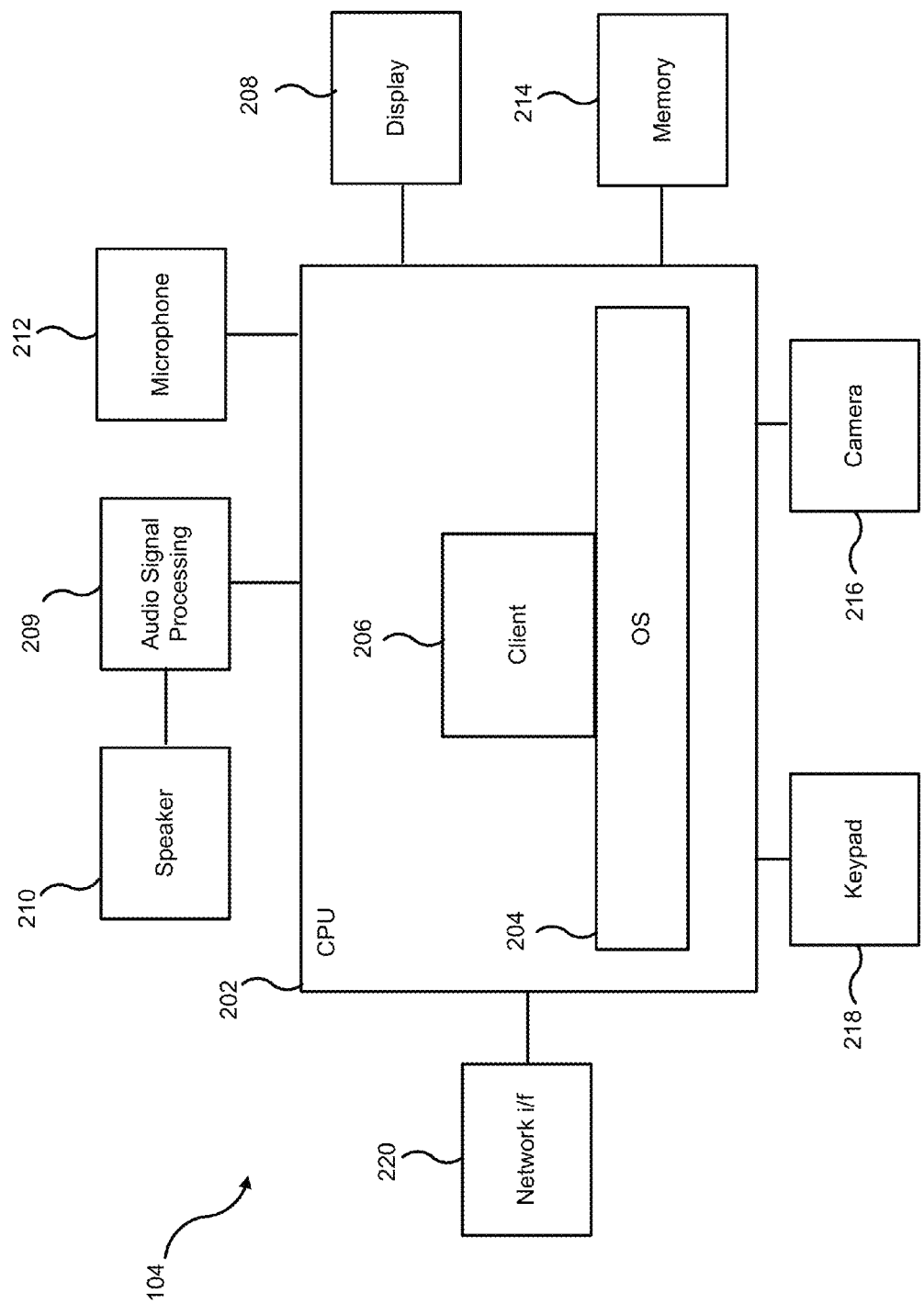
FIG. 2 is a schematic block diagram of a user device.

FIG. 2 illustrates a detailed view of the user device 104 on which is executed a communication client instance 206 for communicating over the communication system 100. The user device 104 comprises a central processing unit ("CPU") or "processing module" 202, to which is connected: output devices such as a display 208, which may be implemented as a touch-screen, and a speaker (or "loudspeaker") 210 for outputting audio signals; input devices such as a microphone 212 for receiving audio signals, a camera 216 for receiving image data, and a keypad 218; a memory 214 for storing data; and a network interface 220 such as a modem for communication with the network 106. The speaker 210 is connected to the CPU 202 via an audio signal processing module 209. The user device 104 may comprise other elements than those shown in FIG. 2. The display 208, speaker 210, microphone 212, memory 214, camera 216, keypad 218 and network interface 220 may be integrated into the user device 104 as shown in FIG. 2. In alternative user devices one or more of the display 208, speaker 210, microphone 212, memory 214, camera 216, keypad 218 and network interface 220 may not be integrated into the user device 104 and may be connected to the CPU 202 via respective interfaces. One example of such an interface is a USB interface. If the connection of the user device 104 to the network 106 via the network interface 220 is a wireless connection then the network interface 220 may include an antenna for wirelessly transmitting signals to the network 106 and wirelessly receiving signals from the network 106.

FIG. 2 also illustrates an operating system ("OS") 204 executed on the CPU 202. Running on top of the OS 204 is the software of the client instance 206 of the communication system 100. The operating system 204 manages the hardware resources of the computer and handles data being transmitted to and from the network 106 via the network interface 220. The client 206 communicates with the operating system 204 and manages the connections over the communication system. The client 206 has a client user interface which is used to present information to the user 102 and to receive information from the user 102. In this way, the client 206 performs the processing required to allow the user 102 to communicate over the communication system 100.

Audio data for output is supplied to the audio signal processing module 209 for processing before output via speaker 210. This processing may comprise nonlinear amplitude processing (e.g. dynamic range compression) as discussed above.

The OS 204 does not provide a loopback signal for use by the client 206.

Figure 3:
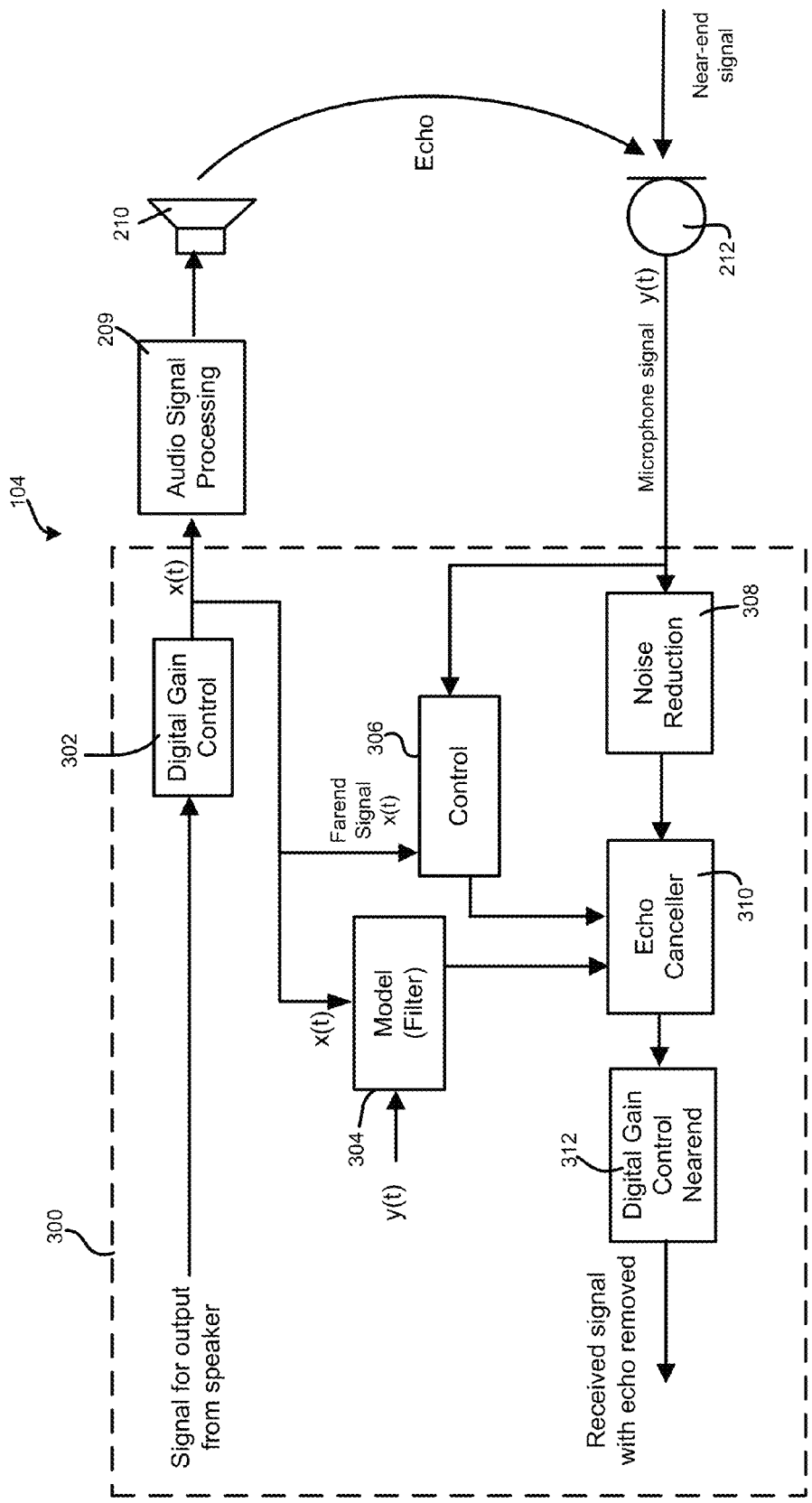
FIG. 3 is a schematic function diagram of an echo cancellation technique.

With reference to FIG. 3 there is now described a method of echo cancellation. FIG. 3 is a functional diagram of a part of the user device 104.

As shown in FIG. 3, the user device 104 comprises the speaker 210, the microphone 212, and a signal processing module 300. The signal processing module 300 (shown as the dashed box in FIG. 3) represents the signal processing functionality implemented by executing communication client application 206 on the CPU 202 of device 104. The signal processing module 300 may comprise digital gain modules 302/312, a modelling module 304 comprising a filter module, a control module 306, a noise reduction module 308, and an echo cancellation module 310. The signal processing functionality implemented by executing communication client application 206 may include more, or less functionality, than that shown in FIG. 3. The user device 104 further comprises the audio signal processing module 209.

To model the echo path gains and estimate the echo captured by a microphone, a reference signal is needed which is the signal labelled as "far-end signal" x(t). This signal represents the audio signal that a communication client sends for playing out from a speaker prior to processing by the audio signal processing module 209.

A signal to be output from the speaker 210 is coupled to an input of the digital gain module 302. An output x(t) (denoted "far-end signal") of the signal processing module 300 is coupled to an input of the audio signal processing module 209. In particular, the output x(t) of the digital gain module 302 is coupled to the input of the audio signal processing module 209. The output of the digital gain control module 302 is also coupled to a first input of the modelling module 304. The output of the digital gain control module 302 is also coupled to a first input of the control module 306. An output of the audio signal processing module 209 is coupled to the speaker 210. It should be noted that in the embodiments described herein there is just one speaker (indicated by reference numeral 210 in the figures) but in other embodiments there may be more than one speaker to which the signal to be outputted is coupled (for outputting therefrom). Similarly, in the embodiments described herein there is just one microphone (indicated by reference numeral 212 in the figures) but in other embodiments there may be more than one microphone which receives audio signals from the surrounding environment. An output y(t) of the microphone 212 is coupled to the signal processing module 300. In particular, the output y(t) of the microphone 212 is coupled to an input of the noise reduction module 308. The output of the microphone 212 is also coupled to a second input of the modelling module 304. The output of the microphone 212 is also coupled to a second input of the control module 306. An output of the modelling module 304 is coupled to a first input of the echo cancellation module 310. An output of the noise reduction module 308 is coupled to a second input of the echo cancellation module 310. An output of the control module 306 is coupled to a third input of the echo cancellation module 310. An output of the echo cancellation module 310 is coupled to an input of the gain control module 312. An output of the gain control module 312 is used to provide the received signal (with echo cancellation having been applied) for further processing in the user device 104.

Figure 6:
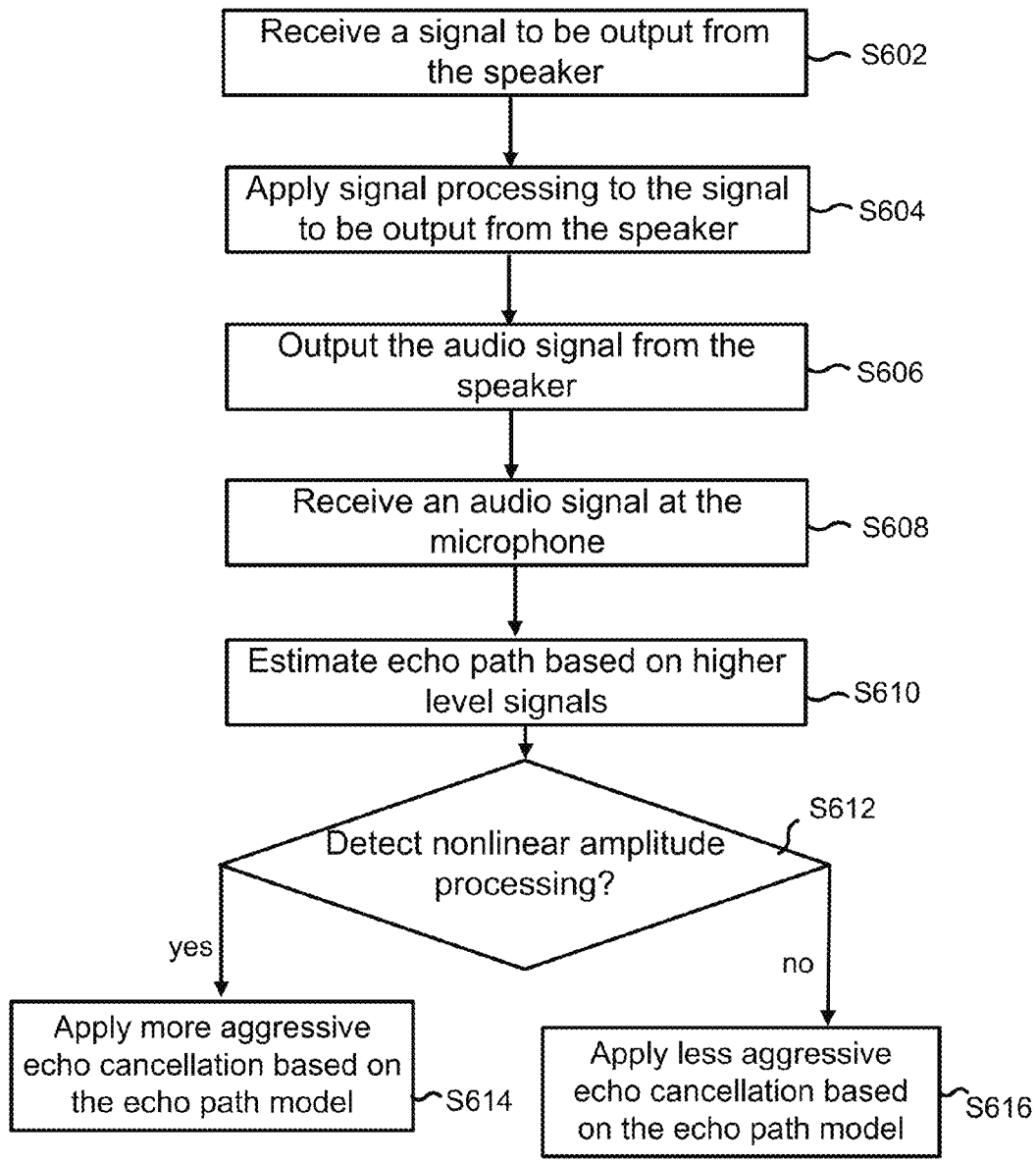
FIG. 6 is a flow chart for an echo cancellation process.

FIG. 6 is a flowchart for a process of the signal processing module 300.

In step S602 a signal is received which is to be outputted from the speaker 210. For example, the signal to be outputted may be a far-end signal that has been received at the user device 104 at network interface 220 from the user device 110 during a call between the users 102 and 108 over the communication system 100. In other embodiments, the signal to be outputted may be received from somewhere other than over the communication system 100 in a call. For example, the signal to be outputted may have been stored in the memory 214 and step S402 may comprise retrieving the signal from the memory 214.

Digital gain module 302 may apply a level of gain to the far-end signal before the far-end signal is supplied to audio signal processing module 209.

In step S604, the far-end signal is processed by the audio signal processing module 209. That is, the audio signal processing module 209 performs digital to analogue conversion (DAC) of the far-end signal and processes the far-end signal in accordance with effects introduced by software executed on CPU 204 before outputting the processed audio signal to speaker 210. The processing that is applied by the audio signal processing module 209 may be time variant and may be different for speech regions to noisy regions of the far-end signal. The processing that is implemented by the audio signal processing module 209 may include nonlinear amplitude processing such as compression whereby different gains are applied to the far-end signal depending on the input level of the far-end signal.

In step S606 the audio signal that has been processed by the audio signal processing module 209 is outputted from the speaker 210. In this way the audio signal that has been processed by the audio signal processing module 209 is outputted to the user 102.

In step S608 the microphone 212 receives an audio signal. As shown in FIG. 3 the received audio signal may include a near-end signal which is a desired signal or "primary signal". The near-end signal is the signal that the user 102 intends the microphone 212 to receive (labelled as near-end in FIG. 3). However, the received audio signal also includes an echo signal resulting from the audio signals outputted from the speaker 210 in step S606. The received audio signal may also include noise, such as background noise. Therefore, the total received audio signal y(t) can be given by the sum of the near-end signal, the echo and the noise. The echo and the noise act as interference for the near-end signal. Although not shown in FIG. 3, analogue to digital (ADC) conversion is applied to the signal captured by the microphone 212 to arrive at the digital signal y(t).

The modelling module 304 takes as inputs the output x(t) of the signal processing module 300 (far-end signal) and the received audio signal y(t). In step S610, the modelling module 304 is used to model an echo path of the echo in the received audio signal y(t).

The echo path describes the effects of the acoustic paths travelled by the audio signals output from the speaker 210 to the microphone 212. The audio signal may travel directly from the speaker 210 to the microphone 212, or it may be reflected from various surfaces in the environment of the near-end terminal. The echo path traversed by the audio signal output from the speaker 210 may be regarded as a system having a frequency and a phase response which may vary over time.

In order to remove the acoustic echo s(t) from the signal y(t) recorded at the near-end microphone 212 it is necessary to estimate how the echo path changes the desired far-end speaker output signal to an undesired echo component in the input signal.

For an approximately linear echo path the echo path h(t) describes how the echo in the received audio signal y(t) relates to the far-end signal x(t) output from the speaker 210, e.g. for a linear echo path represented by the impulse response h(t) according to the equation: $s(t)=\sum_{n=0}^{N_{true}} h_n(t) \times (t-n)$, where s(t) is the echo in the received audio signal y(t), $N_{true}$ is the number of samples of the outputted far-end signal x(t) which are received by the microphone 212 and $h_n(t)$ are the coefficients of the impulse response describing the echo path h(t). The echo path h(t) may vary in both time and frequency and may be referred to herein as h(t) or h(t,f). The echo path h(t) may depend upon (i) the current environmental conditions surrounding the speaker 210 and the microphone 212 (e.g. whether there are any physical obstructions to the passage of the audio signal from the speaker 210 to the microphone 212, the air pressure, temperature, wind, etc.), and (ii) characteristics of the speaker 210 and/or the microphone 212 which may alter the signal as it is outputted and/or received, and (iii) any other process of the signal that might not be reflected in the far-end signal—in particular, due processing by the audio signal processing module 209 (but possibly also due to other factors e.g., buffer delays).

The filter module 304 models the echo path h(t) associated with the echo in the received audio signal y(t) by determining a weighted sum of the current and a finite number (N) of previous values of the outputted far-end signal x(t). The filter module 304 therefore implements an Nth order filter which has a finite length (in time) over which it considers the values of the outputted far-end signal x(t) in determining the estimate of the echo path $\hat{h}(t)$. In this way, the filter module 304 dynamically adapts the filter estimate of the echo path $\hat{h}(t)$. The operation is described by the following equation, which defines the echo in the received audio signal y(t) in terms of the outputted far-end signal x(t): $\hat{s}_1(t)=\sum_{n=0}^{N} \hat{h}_n(t) x(t-n)$. Therefore N+1 samples of the outputted far-end signal x(t) are used, with a respective N+1 weights $\hat{h}_n(t)$. The set of N+1 weights $\hat{h}_n(t)$ is referred to herein simply as the estimate of the echo path $\hat{h}(t)$. In other words the estimate of the echo path $\hat{h}(t)$ is a vector having N+1 values where the filter module 304 implements an Nth order filter, taking N+1 values (e.g. N+1 frames) of the outputted far-end signal x(t) into account.

It can be appreciated that it is easier to adapt the filter estimate of the echo path $\hat{h}(t)$ when the echo is a dominant part of the received audio signal, that is when y(t)≈s(t). However, it may be possible to adapt the filter estimate of the echo path $\hat{h}(t)$ even when the echo is not a dominant part of the received audio signal y(t) if the echo s(t) is independent of the other signal components of y(t).

It will be appreciated by one skilled in the art that the estimate of the echo path $\hat{h}(t)$ does not need to be explicitly calculated, but could be represented by means of filter coefficients obtained from stochastic gradient algorithms such as Least Mean Squares (LMS), Normalized Least Mean Squares (NLMS), Fast Affine Projection (FAP) and Recursive Least Squares (RLS).

The estimate of the echo path $\hat{h}(t)$ is used to provide filter coefficients that filter the far-end signal to generate an estimate $\hat{s}_1(t)$ of the echo component in the microphone signal y(t) in accordance with the estimate of the echo path $\hat{h}(t)$. Regardless of the particular algorithm used, the filter coefficients of the filter module 304 are updated with each iteration of the algorithm, thus the coefficients of the filter module 304 are continually updated over time regardless of the signal conditions at hand.

Whilst the above description refers to the use of a time domain FIR model of the echo path to estimate the echo component in the near end signal y(t) it will be appreciated by those skilled in the art that this is just an example and not limiting in any way. That is, the filter module 304 may operate to determine an estimate of the echo path $\hat{h}(t)$ and thus an estimate $\hat{s}_1(t)$ of the echo component in the near end signal y(t) in the time domain or in the frequency domain.

Estimation of the echo path is typically based on high energy signals as those are the signals that produce the most reliable echo path estimates.

As indicated, the above-described modelling assumes an approximately linear echo path i.e. such that output signal amplitude of the echo path scales linearly with input signal amplitude of the echo path. However, as discussed, the echo path as modelled by modelling module 403 includes the audio signal processing module 209. Processing by the audio signal processing module 902 may include nonlinear amplitude processing (e.g. compression) whereby output signal amplitude of the audio signal processing module does not scale linearly with input signal amplitude of the signal processing module, in which case the assumption of a linear echo path does not hold.

Nevertheless, successful echo cancellation can still be achieved by modelling the nonlinear echo path as linear (even though this assumption is incorrect) and the nonlinearities accounted for by the echo cancellation module 310 applying more aggressive echo suppression for a particular modelled echo path (i.e. an echo path having a linear model, but which is nonlinear in reality) than it would apply for that particular echo path were it in fact linear (i.e. an echo path having that same linear model, and which is in fact substantially linear in reality).

This will have the cost of being less transparent for double-talk, fading the near-end speaker and making it more difficult to interrupt, which is why these settings should not be applied unless strictly necessary (i.e. should only be applied when substantial nonlinear amplitude processing in present in the echo path).

The control module 306 receives the far-end signal x(t) and the microphone signal y(t). The control module 306 is able to detect (S612) a condition indicative of dynamic range compression (a form of nonlinear amplitude processing) by the audio signal processing module 209 and to control the echo cancellation module 310 based on this detection. Further, using the disclosed techniques, it is even possible to detect to what degree compression is applied, and tune the echo canceller accordingly. A degree of compression can be detected on any scale, (for instance, 0-1). For example, for a detected degree of 0.1, more aggressive settings may be applied to the echo canceller (than for, say, 0); for a detected degree of 0.5, even more aggressive settings; and at 1.0 the most aggressive settings but nonetheless still acceptable (i.e. so as not to destroy the double talk, introduce too much fading etc.).

If at step S612 a condition indicative of compression by the audio signal processing module 209 is detected, the control module 306 controls the echo canceler to apply (S614) more aggressive echo cancellation based on the (linear) echo path model of modeling component 304 to account for nonlinearities in the linearly modeled echo path. If no such condition is detected at S612, the control module 306 controls the echo canceler to apply (S614) less aggressive echo cancellation based on the (linear) echo path model of modeling component 304 on the assumption that the linear model is a true reflection of the physical echo path itself.

In other words, control by the control module 306 diminish or decrease the effect the non-linear echo path has on the echo canceller performance. The echo path will probably not be modelled accurately, since it is non-linear, but the echo canceller takes other means, such as over-suppression to prevent echo leaks in spite of this inaccuracy. This represents a computationally efficient mechanism for declining with nonlinear echo paths as it does not require any form of non-linear modeling (which is likely to be computationally expensive).

This condition is detected by comparing the signals x(t) and y(t) as will be described in more detail below. Signal processing may be performed on a per frame basis. As there might be a delay between the signals x(t) and y(t) this additional delay needs to be estimated for it to be possible to make this comparison (i.e. to match a frame of the signal x(t) to a corresponding frame of the signal y(t) for the comparison).

The noise reduction module 308 is arranged to lower the noise level of the microphone signal y(t) without affecting the speech signal quality of the microphone signal y(t). Various noise reduction techniques are known to persons skilled in the art for the purpose of eliminating noise. Spectral subtraction is one of these methods to enhance speech in the presence of noise. Spectral subtraction, uses estimates of the noise spectrum and the noisy speech spectrum to form a signal-to-noise (SNR) based gain function which is multiplied with the input spectrum to suppress frequencies having a low SNR. The aim of this process is to obtain an audio signal which contains less noise than the original.

A filter module in the modelling module 304 filters the far-end signal x(t) to generate an estimate of the echo component in the microphone signal y(t) in accordance with the estimate of the echo path.

The echo cancellation module 310 comprises an echo suppression module arranged to apply echo suppression to the high level portions of the received audio signal y(t). The purpose of the echo suppressor 310 is to suppress the loudspeaker echo present in the microphone signal, e.g. in a VoIP client, to a level sufficiently low for it not to be noticeable/disturbing in the presence of the near-end sounds (non-echo sounds) picked up by the microphone 212. Echo suppression methods are known in the art. Furthermore, the echo suppression method applied by the echo cancellation module 310 may be implemented in different ways. As such, the exact details of the echo suppression method are therefore not described in detail herein.

The echo cancellation module 310 is arranged to receive as input the estimate of the echo component in the microphone signal $\hat{s}_1(t)$ and the microphone signal y(t) itself following noise reduction implemented by noise reduction module 308. The echo cancellation module 310 is arranged to determine the power of the estimated echo and the power of the microphone signal y(t) following noise reduction. In the echo cancellation module 310 the estimated echo power is used together with the determined power of the microphone signal y(t), and the output of the over-suppression factor estimation module 306 to form echo suppression gains G(t, f) for time t and frequency f. The echo suppression gain has the purpose of suppressing any echo s(t) in the microphone signal y(t) to such a level that they are not noticeable.

The more aggressive echo cancellation may, for instance, include applying echo suppression across all frequency bands f of an audio spectrum of the audio signal received by the echo cancellation module 310 in contrast to the less aggressive echo suppression which may, for instance, include applying echo suppression only in selective frequency band of that spectrum and not in other frequency bands of that spectrum. The more aggressive echo cancellation may also include applying a higher level of gain reduction to the audio signal received by the echo cancellation module 310 (across one or more frequency bands of the spectrum or across the whole spectrum) as compared to the less aggressive echo cancellation which may include applying a lower level of gain reduction to the audio signal received by the echo cancellation module 310 (across one or more frequency bands of the spectrum or across the whole spectrum).

Alternatively or additionally, the control mechanism for when to apply echo suppression (in time) can be altered to apply more aggressive echo suppressions by applying echo suppression in more frames than what would be the case with the normal settings. For example, whenever near-end speech is detected, the echo suppression effectively stops; thus, if echo is (wrongly) detected as near-end speech, this results in echo-leak. So, one approach would be to alter the detector for near-end voice activity to make it less sensitive, so that we would not be as likely to pick up echo as near-end speech.

The echo cancellation module 310 outputs the received signal, with the echo having been suppressed, for further processing at the digital gain control module 312

The signal output from the digital gain control module 312 may be processed by the client 206 (e.g. encoded and packetized) and then transmitted over the network 106 to the user device 110 in a call between the users 102 and 108. Additionally or alternatively, the signal output from the digital gain control module 312 may be used for other purposes by the user device 104, e.g. the signal may be stored in the memory 214 or used as an input to an application which is executing at the user device 104.

A process for detecting dynamic range compression will now be described. The process involves comparing first and second audio signals, the second audio signal being a processed version of the first, to detect a condition indicative of that processing of the first signal including dynamic range compression (a form of nonlinear amplitude processing).

This process is implemented by the control module 306 with the far-end signal x(t) as the first signal and the microphone signal y(t) as the second signal. The disclosed technique thus provides a way to detect whenever, and to what degree, compression has been added in the echo path. As discussed, knowledge of whether or not compression was added can be used to tune the echo suppressor differently e.g. to be more aggressive to eliminate all echo in the signal when such compression is present.

The condition indicative of compression of the first signal (here, the far-end signal x(t)) is detected by comparing parameters of amplitude distributions for the first signal (here, the far-end signal x(t)) and the second signal (here, the microphone signal y(t)) respectively.

As used herein, an "amplitude distribution" $D_{a(t)}$ for a signal a(t) (i.e. having an amplitude a(t) at time t) is defined over (spans) a set of values V, each value v∈V in the set V corresponding to one or more possible values of signal amplitude a (e.g. the set V being a set of signal amplitude values over which the distribution is defined, e.g. a range $[a_1, a_2]$, each value v∈V being a signal amplitude; the set V being a set of values of a function of the signal amplitude e.g. a range $[f(a_1), (a_2)]$ such as $[|a_1|, |a_2|]$). The distribution has a size $D_{a(t)}$ (v) for each value v□V in the set V, that size pertaining to (for instance, being proportional to) an observed average rate at which amplitudes corresponding to that value v□V appear in the signal a(t) (e.g. for a distribution $D_{a(t)}$ defined over a set of amplitude magnitudes $[|a_1|, |a_2|]$, the size of the distribution $D_{a(t)}$ ($|a_n|$) pertains to an observed rate at which amplitudes having magnitude $|a_n|$—which is both amplitudes $a_n$ and $-a_n$—occur in the signal a(t)).

For a digitally sampled audio signal, the amplitude distribution may be a histogram $H_{a(t)}$ defined over a set values B, each value being a bin b∈B, each bin being a range of amplitude values $b=[|a_m|, |a_n|]$ (that is a range of amplitude magnitude values greater than or equal to $|a_m|$ but less than $|a_n|$), such that the histogram is defined over a set of such bins $B=\{b_1=[|a_1|, |a_2|), b_2=(|a_2|, |a_3|), \ldots \}$, the histogram $H_{a(t)}$ having a size $H_{a(t)}$ (b) for each bin b∈B, that size pertaining to an observed average rate at which amplitudes occur in the signal a(t) having magnitudes in that bin $b=[|a_m|, |a_n|)$ (i.e. having magnitudes in the range $[|a_m|, |a_n|)$.) In this example, each bin (i.e. each value b of the distribution set B) corresponds to amplitudes having respective magnitudes in that bin b.

Figure 4:
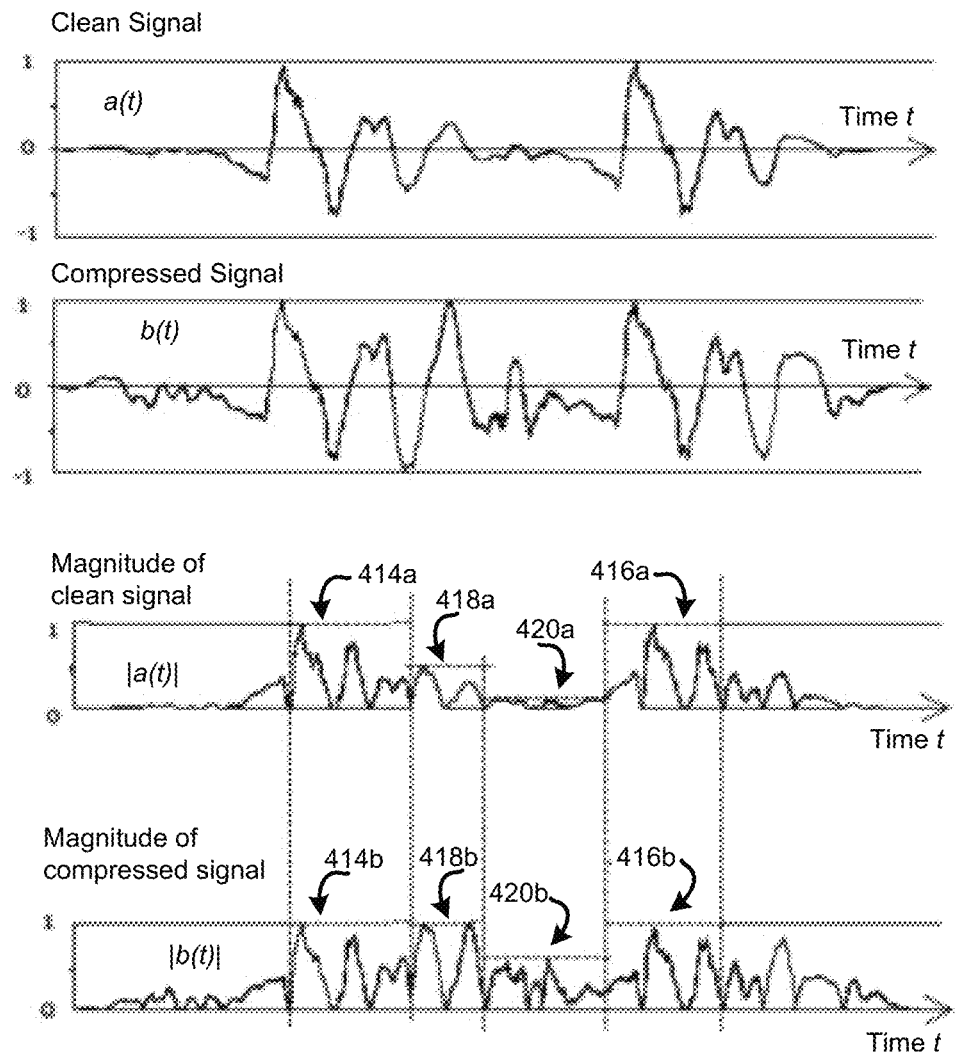
FIG. 4 is a schematic illustration of a comparison of clean and processed audio signals.
Figure 4A:
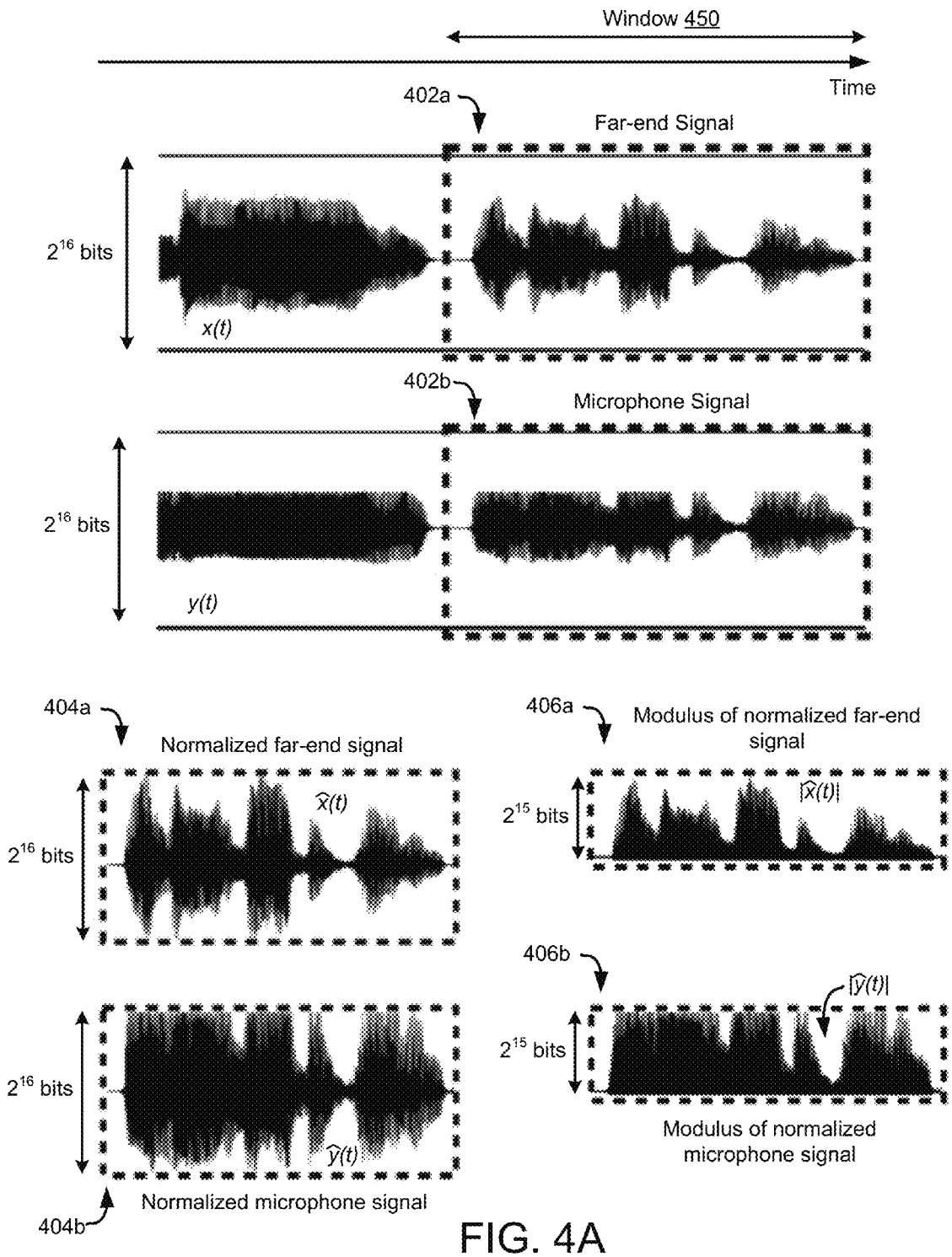
FIG. 4A is another schematic illustration of a comparison of clean and processed audio signals.

E.g. an amplitude distribution in the form of a histogram $H_{a(t)}$ may be defined for a digital audio signal comprised of a plurality of samples $\{s_1, s_2 \ldots \}$ (e.g. as shown in FIG. 4A, which is a schematic illustration of portions of digital audio), each sample having a respective integer amplitude falling within a set $[0, 2^N]$ where N is an audio bit depth e.g. 16 bits, 32 bits etc., the histogram being defined over a set of sample magnitudes (there being $[0, 2^{N-1}]$ possible values of sample magnitude in total as each sample magnitude $|s_1|$ corresponds to two samples, one representing a positive signal amplitude of the signal a(t) and one representing a negative signal amplitude of the signal a(t)). The histogram $H_{a(t)}$ may have a size $H_{a(t)}$ (b) for each bin b which is determined by counting a number of samples within the digital audio signal which occur having a magnitude in that bin b.

Another example of an amplitude distribution is a probability density function (PDF), with an integral of that PDF across a subset of the range of values spanned by the PDF being proportional to an observed average rate at which amplitudes corresponding to values within that subset occur within the analogue signal (e.g. the integral across a subset of amplitudes being proportional to a rate at which amplitudes occur within the analogue signal having an amplitude in that subset; or the integral across a subset of amplitude magnitudes being proportional to a rate at which amplitudes occur within the analogue signal having a magnitude in that subset etc.). A PDF can be effectively considered a form of histogram having a large number of small bins such that the histogram becomes effectively continuous.

Any amplitude processing performed on the uncompressed audio signal typically results in a reshaping of this distribution as the amplitude processing is likely to alter the average rate at which particular amplitude values occur within the signal.

The signals a(t) and b(t) are shown as normalized waveforms—that is, scaled to have a substantially equal peak (maximum) magnitude of signal amplitude i.e. such that $$\max_t |a(t)| = \max_t |b(t)|, |.|$$

being an absolute value function which is evaluated as its input for inputs not less than zero and as the negative of its input for values less than zero such that |.| is always positive-valued. They may, for instance, represent audio signals, one or both of which have undergone audio normalization processing i.e. scaled as a(t)→A*a(t) and/or b(t)→B*b(t), A and B being positive constants such that $$\frac{B}{A} = \frac{\max_t |a(t)|}{\max_t |b(t)|}.$$

Audio normalization of one or both of the signals—such that, post-said normalization, each has a substantially equal peak (maximum) magnitude of amplitude—can be used to account for any linear amplitude scaling of the clean and compressed signals relative to one another (e.g. caused by a linear volume adjustment of one relative to another, linear amplitude attenuation due to one having been transmitted over air via a speaker and received via a microphone etc.).

Audio normalization is a process whereby a signal is uniformly scaled in amplitude to have a common peak amplitude magnitude of e.g. a predetermined peak magnitude of, say, 0 dBFS ("Decibels Relative to Full Scale), a technique known in the art.

However, such normalization does not account for nonlinear amplitude processing as can be seen in FIG. 4. FIG. 4 shows respective sections of waveforms for first and second time-varying audio signals a(t) (labelled as "clean signal" in FIG. 4) and b(t) (labelled as "compressed signal" in FIG. 4), b(t) being a compressed version of a(t).

For example, the signals a(t) and b(t) may be normalized portions of the far-end signal x(t) and the microphone signal y(t) respectively.

Also shown in FIG. 4 are corresponding time-varying amplitude magnitudes |a(t)| and |b(t)| for signals a(t) and b(t) respectively.

Effects of compression can be seen by comparing the signals |a(t)| (i.e. the magnitude of the normalized clean signal) and |b(t)| (i.e. the magnitude of the normalized compressed signal). For instance, lower-amplitude regions 418a and 420a of the clean signal have (local) peak magnitudes which are substantially different from (specifically, lower than) those of higher-amplitude regions 414a and 416a of the clean signal. However, as can be seen in FIG. 4, these differences are substantially reduced by compression, and this reduction is unaffected by the signals a(t), b(t) being normalized: lower-amplitude regions 418b and 420b of the normalized compressed signal have (local) peak magnitudes significantly closer to those of higher-amplitude regions 414b and 416b of the normalized compressed signal than the corresponding lower-amplitude regions 418a and 420a of the normalized clean signal have to the corresponding lower-amplitude regions 414a and 416a of the normalized clean signal.

Because of this, an amplitude distribution for the normalized compressed signal, defined across e.g. a range of values of signal amplitude or a range of values of a function of the signal amplitude (magnitude thereof etc.), will have a shape different from that of a corresponding amplitude distribution for the normalized clean signal, defined across a range of values of signal amplitude or a range of values of a function of the signal amplitude (magnitude thereof etc.).

Figure 4B:
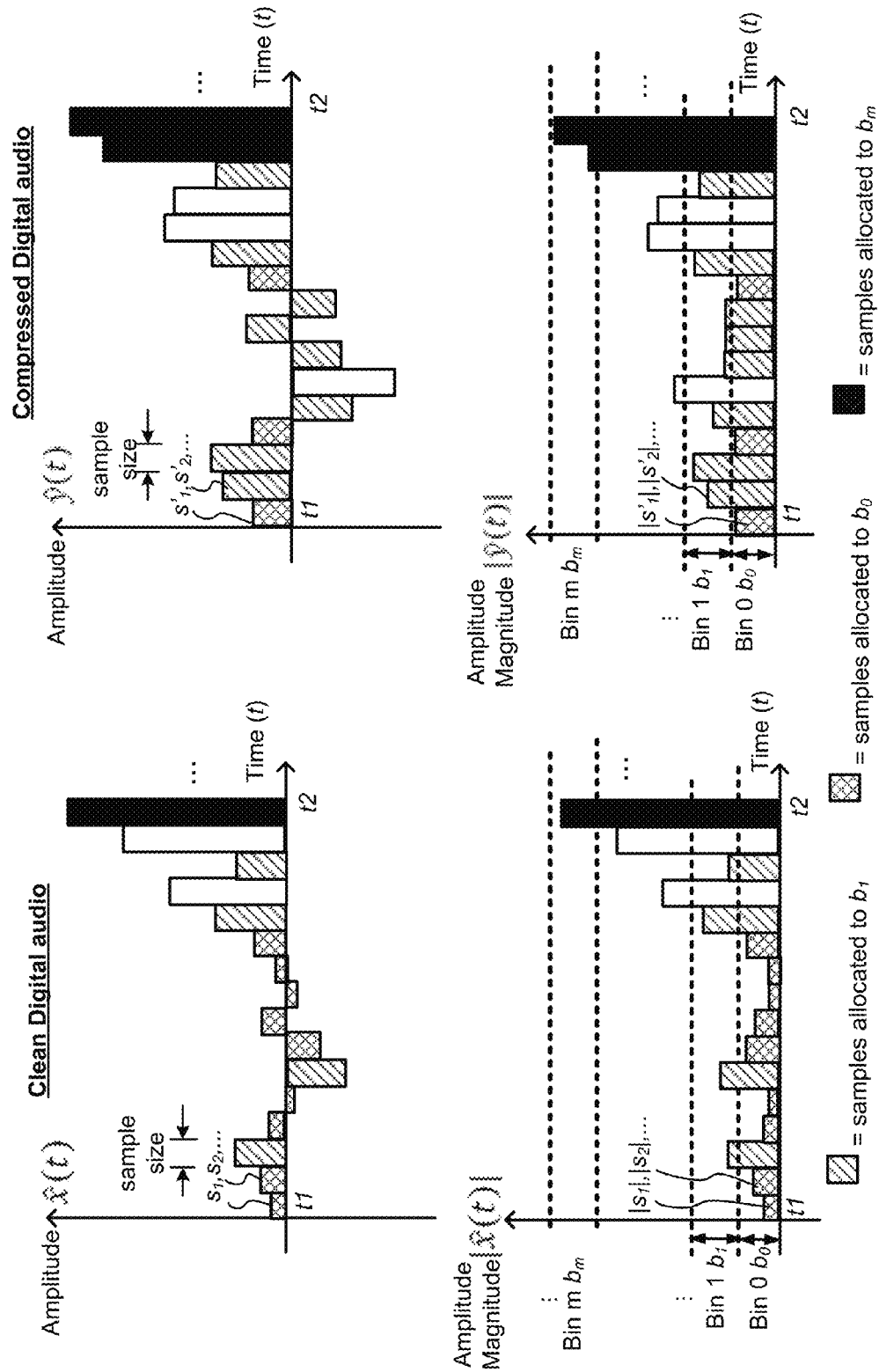
FIG. 4B is a schematic illustration of clean and processed digital audio signals.
Figure 4C:
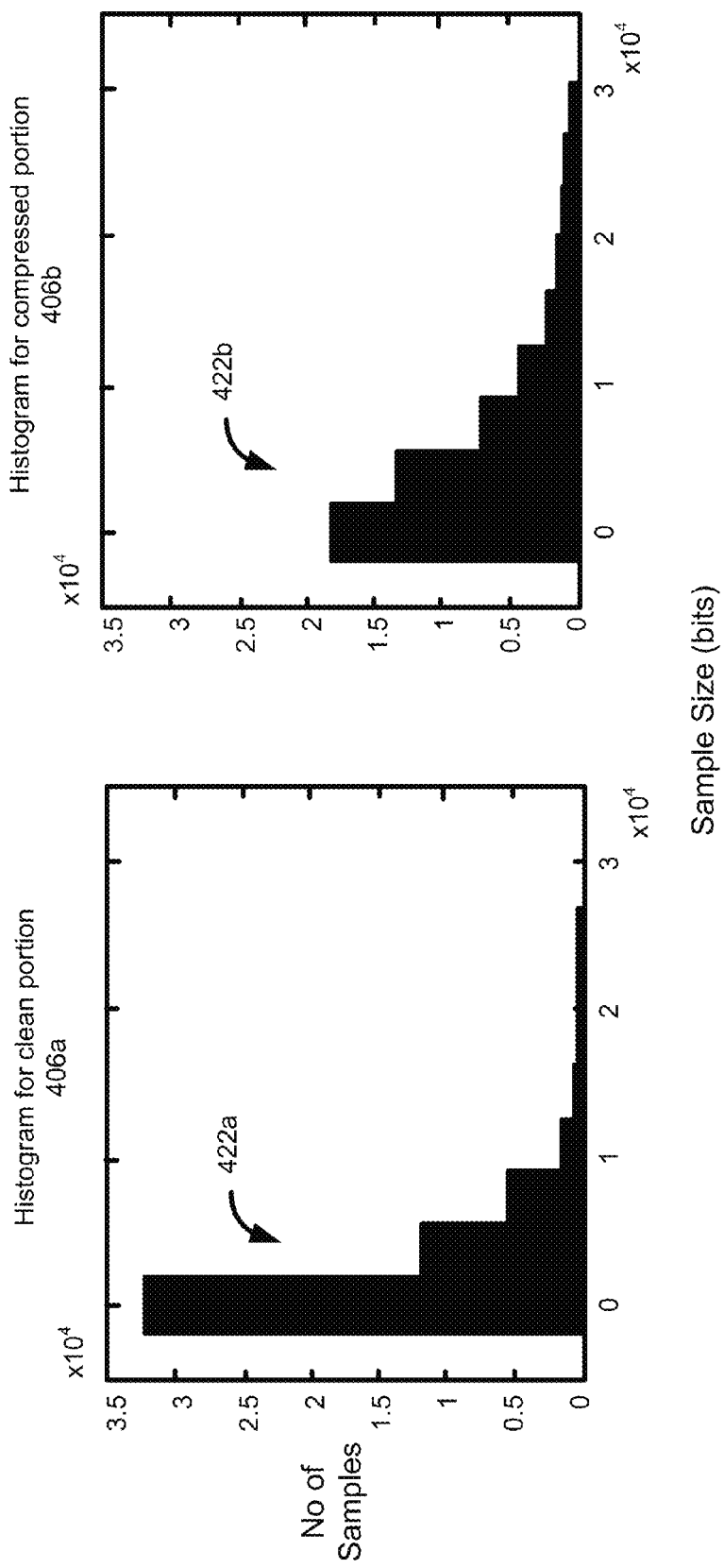
FIG. 4C is a schematic illustration of amplitude distributions for clean and compressed audio signals respectively.

For example, an amplitude distribution in the form of a histogram 422a over a range of amplitude magnitude values (running from 0 to 2^15 bits) for an uncompressed digital speech signal, and a corresponding amplitude distribution in the form of a histogram 422b over a range of amplitude magnitude values (running from 0 to 2^15 bits) for a compressed version of that signal (and normalized relative to that signal) are shown in FIG. 4C. The clean audio has a peaked distribution 422a, peaked at zero, whereas the compressed speech has a more even distribution 422b with more amplitudes occurring with magnitudes sufficiently greater than zero to be pushed out of the lowest bin (the number of amplitudes exactly=0 likely remains the same; however, small but nevertheless non-zero amplitudes are increased).

The detection process disclosed herein exploits the above amplitude distribution differences by determining respective parameter(s) of respective amplitude distributions for clean and processed audio signals, and detecting a condition indicative of said processing of the clean signal including nonlinear amplitude processing (e.g. dynamic range compression) by comparing the determined parameter(s) of the clean signal with the determined parameter(s) of the processed signal. Equal or similar parameters indicate that said processing does not involve nonlinear amplitude processing (and at most involves linear amplitude processing) while substantially different parameters indicate that said processing does involve nonlinear amplitude processing.

For normalized digital audio comprised of a temporal sequence of samples each having a corresponding (integer) value representing an amplitude of an audio signal at that time, this means samples of a compressed (specifically, an upwardly compressed), normalized version of that signal will, on average, have a value of greater (integer) magnitude than that of the corresponding sample of the original.

In the described embodiments, amplitude distributions in the form of histograms of amplitude values of the far-end signal x(t) and the microphone signal y(t) respectively are used for detecting nonlinear amplitude processing in the echo path, with a more (resp. less) aggressive tuning of the echo canceller being effected if such processing is (resp. is not) detected (discussed above).

Figure 5:
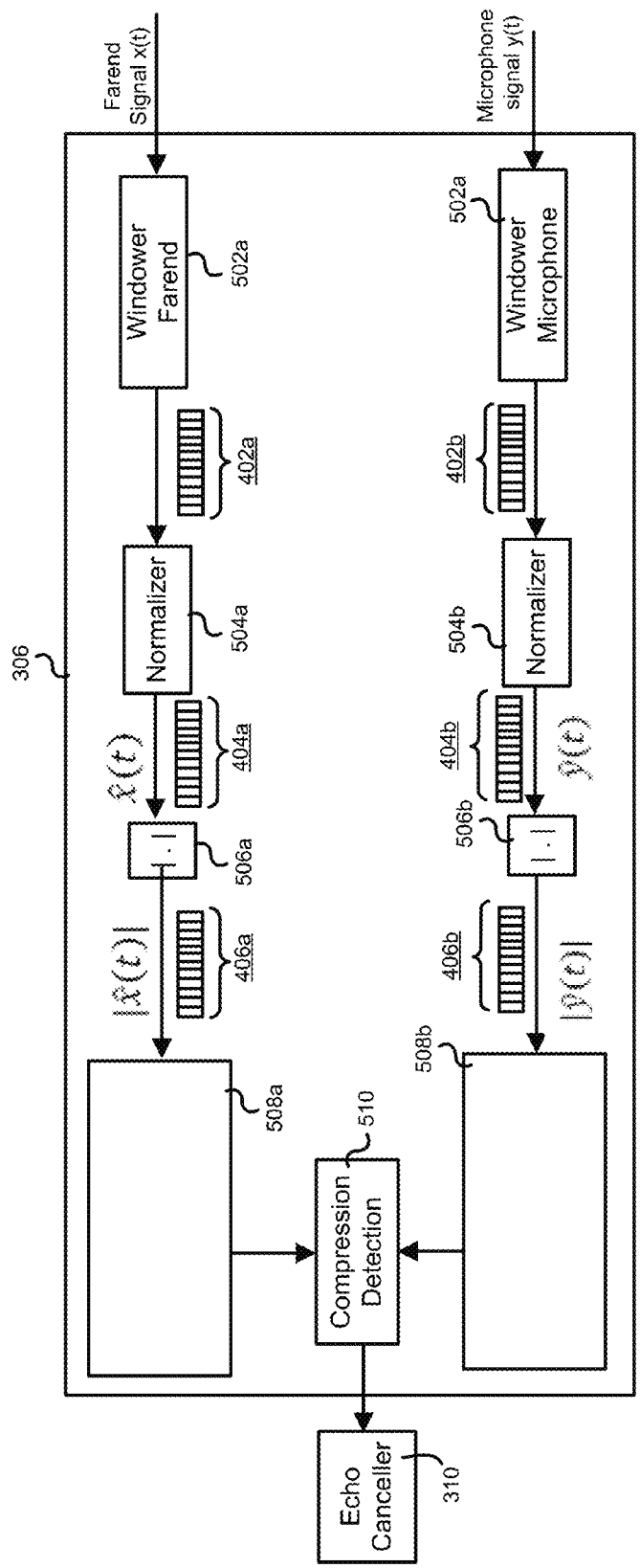
FIG. 5 is a schematic function diagram of a nonlinear amplitude processing detection technique.

The detection process is implemented by the control module 306 of the signal processing module 300. As shown in FIG. 5, the control module comprises first and second window modules 502a, 502b; first and second amplitude normalization modules 540a, 504b; first and second amplitude magnitude modules 506a, 506b; first and second amplitude distribution modules 508a, 508b, and a compression detection module 510. The first (resp. second) window module has an input configured to receive the far-end signal x(t) (resp. microphone signal y(t)) and an output. The first normalization module 504a (resp. second normalization module 504b) has an input coupled to the output of the first (resp. second) window module 502a (resp. 502b) and an output. The first (resp. second) magnitude module 506a (resp. 506b) has an input coupled to the output of the first (resp. second) normalization block 504a (resp. 504b) and an output. The first (resp. second) distribution module 508a (resp. 508b) has an input coupled to the output of the first (resp. second) magnitude module 506a (resp. 506b).

The comparison module 510 has first and second inputs coupled to the output of the first distribution module 508a and the output of the second distribution module 508b respectively and an output C coupled to the third input of the echo cancellation module 310 (this output C being the output of the control module 306).

The first window module receives the far-end signal x(t) and stores a most recently-received portion 402a thereof (i.e. most recently received samples thereof) spanning a temporal window (450 in FIG. 4A). An exemplary portion 402a of the far-end signal x(t) is shown in FIG. 4A (most recent portion of signal x(t). The second window module receives the microphone signal y(t) and stores a most recently-received portion 402b thereof (i.e. most recently received samples thereof) spanning the same temporal window 450. An exemplary portion 402b of the microphone signal y(t) is shown in FIG. 4A (most recent portion of signal y(t)). The detection process may be frame-based, with frame sizes of (e.g.) 5 or 10 ms or similar (or indeed, anything in the order of 1-100 ms). The portion is updated every time a frame is received so as to add the latest samples (of the latest frame) and remove the oldest samples (of the oldest frame). Each of the respective outputs is in the form of a set of sample (amplitude) values, one for each sample within the window. The window could have a size of approximately 1 second such that the most recent 1 second of far-end audio (resp. microphone audio) is stored by the first (resp. second) window module 502a (resp. 502b). However, other window sizes may be used. The first and second window modules 502a, 502b output the respective stored far-end signal and microphone signal portions within that window to the first and second normalizer modules 504a, 504b respectively. Alternatively, as explained below, an effective window size of approx. 1 second can be achieved without having to buffer as much audio data e.g. with only a frame of audio being buffered at any given time.

The first and second normalizer modules receive the far-end and microphone portions from the first and second window modules respectively and perform a respective amplitude normalization process thereon. Each audio normalization process involves applying a uniform gain to the respective received audio signal portions to bring (maximum) peak amplitude magnitude to a target level common to both. The first and second normalization modules output a normalized far-end signal portion 404a and a normalized signal microphone signal portion 404b respectively. Exemplary normalized far-end and microphone signal portions 404a, 404b are shown respectively in FIG. 4A (signals $\hat{x}(t)$, $\hat{y}(t)$ respectively). These outputs are in the form of a set of normalized sample (amplitude) values, one for each sample of the received audio portions.

The first and second magnitude modules 506a, 506b receive the normalized far-end and microphone signals 404a, 404b respectively and performs a respective magnitude operation thereon. Each magnitude operation involves converting the amplitude at every point in the normalized portions (i.e. for each sample of that portion), which may be either positive-valued or negative-valued, to a positive-valued magnitude by calculating an absolute value (modulus) of the amplitude at every point in the normalized portion (i.e. for each sample of that portion). The first and second magnitude modules output far-end and microphone signal-magnitude portions 406a, 406b. Exemplary far-end and microphone signal-magnitude portions 406a, 406b are shown respectively in FIG. 4C (signals $|\hat{x}(t)|$, $|\hat{y}(t)|$ respectively). These outputs are in the form of a set of (amplitude) magnitude values, one for each sample of the received normalized audio samples.

The first amplitude distribution module 508a determines at least a first parameter of an amplitude distribution for the far-end signal x(t) based on the far-end signal-magnitude portion 406a received from the first magnitude module 506a. The second amplitude distribution module 508b determines at least a second parameter of an amplitude distribution for the microphone signal y(t) based on the microphone signal-magnitude portion 406b received from the second magnitude module 506b. The compression detection module 510 receives the first and second parameters and compares them to one another to detect nonlinear amplitude processing by the audio signal processing module 209. This is described in detail below.

The detection is based on the fact that, for reasons discussed above, an amplitude distribution in the form of a histogram (422a in FIG. 4C) of the absolute values of audio samples of the microphone signal y(t) vary significantly depending on whether or not that signal has undergone dynamic range compression. More specifically, it is based on the fact that the histogram 422a is substantially different from an equivalent histogram (422b in FIG. 4C) of the absolute values of audio samples of the far-end signal x(t) when nonlinear processing by audio signal processing module 209 is present in the echo path and that, in contrast, these histograms 422a, 422b are substantially the same when no such nonlinear amplitude processing is present in the echo path.

The inventors have found that a coarse histogram with a limited number of bins (approximately ten bins for 16-bit digital audio) is typically sufficient for this, which represents a computationally cheap detection process (i.e. effecting dynamic range detection with minimal consumption of computer resources such as processor resources and memory resources).

Each histogram 422a, 422b is calculated by the respective magnitude module 506a, 506b first taking the absolute value of the speech samples and then by the respective distribution module 508a, 508b allocating each of said absolute-valued samples to an appropriate bin and then summing the number of samples that goes in each bin, i=0, . . . , N−1, where N is the number of bins. The bins are linearly distributed on a full magnitude scale [0, 32768] (for 16-bit integer representation as for such a representation magnitudes of positive and negative amplitudes vary between 0 and at most $2^{16}/2=32768$—this can be seen in FIG. 4A). Each bin is a sub-range of sample magnitude valued being a subset of the set [0, 32768] e.g. bin 0 may be a sub-range [0, 32768/N], bin 1 may be a sub-range [(32768/N)+1 to 2*32768/N} etc.

In FIG. 4C, horizontal axes represent amplitude magnitude values for audio samples, divided into the histogram bins, and vertical axes represent number of samples having an amplitude magnitude with a value in that bin.

Samples are allocated to bins by the respective distribution modules 508a, 508b as follows: all samples across the respective received set of sample magnitude values are considered and whenever a sample is observed having a magnitude in bin m (m between 0 and N−1 inclusive), a count for that bin m is incremented by 1, the total count for that bin after all samples have been considered being the value of that bin.

This is illustrated in FIG. 4B. FIG. 4B shows illustrative portions of the normalized far-end and microphone signals—$\hat{x}(t)$ (comprised of a temporal sequence of audio samples $\{s_1, s_2, \ldots\}$) and $\hat{y}(t)$ (comprised of a temporal sequence of audio samples $\{s'_1, s'_2, \ldots\}$) respectively—which are shown as digital signals comprised of a plurality of digital audio samples of fixed size corresponding to a same range of times [t1,t2] within each signal. Also shown are corresponding time-varying signal magnitudes $|\hat{x}(t)|$, $|\hat{y}(t)|$ for $\hat{x}(t)$, $\hat{y}(t)$ respectively ($|\hat{x}(t)|$ being comprised of a sequence $\{s_1, |s_2|, \ldots\}$ of absolute values (magnitudes) of the corresponding samples $\{s_1, s_2, \ldots\}$; ($|\hat{y}(t)|$ being comprised of a sequence $\{|s'_1|, |s'_2|, \ldots\}$ of absolute values (magnitudes) of the corresponding samples $\{s'_1, s'_2, \ldots\}$). It will be appreciated that only a small selection of samples is shown in FIG. 4B and typically the window 450 will contain many more samples (e.g. of order $10^4$ samples for about 1 second of 16-bit audio; at 24 kHz operation, about 24000 samples per second).

As shown in FIG. 4B, the bin 0 is a first range of lowest amplitude magnitude values, the bin 1 is a next range of higher amplitude values, . . . , bin m is a higher range of higher amplitude values etc. For the far-end signal x(t), a majority of samples are allocated to (that is have magnitudes within) bin 0, with fewer samples allocated to (that is having magnitudes in) higher bins (that is, bins spanning a range of values with greater magnitudes: bin 1, . . . , bin m, . . . , bin N−1). For the microphone signal y(t) containing an echo component which has been subject to compression, an effect of the compression is to push up sample amplitude magnitudes and thus to push samples from each but the highest bin into higher bins.

Thus, for the normalized far-end signal, observations of the samples shown in FIG. 4B would increase the count for bin 0 by 9 (there being 9 samples shown allocated to that bin 0), the count for bin 1 by 4 (there being 4 samples shown allocated to that bin 1), the count for bin m by 1 (there being 1 sample shown allocated to that bin 1). In contrast, for the normalized microphone signal, observations of the samples shown in FIG. 4B would increase the count for bin 0 by only 3 (there being only 3 samples shown allocated to that bin 0 due to samples having been pushed up out of that bin due to the compression), the count for bin 1 by 8 (there being 8 samples shown allocated to that bin 1, samples having been pushed up from bin 0 into bin 1 by the compression), the count for bin m by 2 (a sample having been pushed up into that bin by compression).

FIG. 4C shows an example of histograms 422a (for the normalized neared signal $\hat{x}(t)$), 422b (for the normalized microphone signal $\hat{y}(t)$) each having a respective plurality of bins $\{b_0, b_1, \ldots\}$, $\{c_0, c_1, \ldots\}$ for clean and compressed speech signals respectively, the histograms being calculated based on samples observed in portion window 450, in the manner described above, by the respective distribution modules 508a, 508b based on the respective outputs of the magnitude modules 506a, 506b. The clean speech has a peaked distribution at zero, whereas compressed speech is more evenly distributed and has more samples at higher amplitudes. That is, the clean speech contains many more samples close to 0, compared to the compressed speech which is more evenly distributed. This is due to lower amplitude magnitude samples being pushed up into higher amplitude magnitude bins by compression, as indicated above.

As indicated above, rather than buffering an entire window's-worth of data (e.g. 1 second's-worth), the histogram filling process could be until one bin of the histogram is full (for 16 bit precision, 32767 counts—that is in the order of 1 second). The detection process (e.g. algorithm) loops through samples of a frame one-by-one and put them in bins, that looping being performed once per every received frame. In this case, there is no need to buffer as much as 1 second of audio data; the process runs on the small audio chunks (e.g. frames) available, each being used to update the histogram, and then stores the histogram data only (discarding the buffered audio); 1 second's-worth of audio data is still approximately the amount of data used for one "decision" about compression to be made and thus 1 second is an effective window size.

In one embodiment, respective parameters for the distributions may be determined by distribution modules 508a, 508b comparing an upper portion of a histogram (522a, 522b respectively) to a lower portion of that same histogram (522a, 522b respectively) to determine respective first and second weight parameters. These parameters are provided to detection module 510 where they are compared to one another as part of the nonlinear amplitude detection by the detection module 510.

For instance, a respective lower sum ($S_L^{\hat{x}(t)}$) and upper sum ($S_U^{\hat{x}(t)}$) of the bins of histogram 422a is calculated by distribution module 508a and a respective lower sum ($S_L^{\hat{y}(t)}$) and upper sum ($S_U^{\hat{y}(t)}$) of the bins of histogram 422b is calculated by distribution module 508b as follows:

508a calculates for histogram 422a having bins $\{b_0, b_1, \ldots\}$, there being a respective number of values $\{h_0, h_1, \ldots\}$ in each bin:

$$S_L^{\hat{x}(t)} = \Sigma_{i=p}^{q} h_i, S_U^{\hat{x}(t)} = \Sigma_{i=r}^{s} h_i,$$

where $h_i$ is the number of values in bin $b_i$ and where $b_p \le b_q$, $b_r \le b_s$, $b_p \le b_s$; and

508b calculates for histogram 422b having bins $\{c_0, c_1, \ldots\}$, there being a respective number of values $\{g_0, g_1, \ldots\}$ in each bin:

$$S_L^{\hat{y}(t)} = \Sigma_{i=p}^{q} g_i, S_U^{\hat{y}(t)} = \Sigma_{i=r}^{s} g_i,$$

where $g_i$ is the number of amplitude values in bin $c_i$ and $c_p \le c_q$, $c_r \le c_s$, $c_p < c_s$.

The sum may be over the same (or at least similar) range for each such that $b_p = c_p$, $b_q = c_q$, $b_r = c_r$, $b_s = c_s$ (or such that at least $b_p \approx c_p$, $b_q \approx c_q$, $b_r \approx$, $b_s \approx c_s$.

Limits between bins can be tuned on a case by case basis as part of a normal design procedure. Empirically, the inventors have found that bin number 2 should be part of the upper sum and that bin 0 can be excluded from the summation of the lower bin all together. For histograms 522a, 522b having respective bins $\{b_0, b_1, \ldots, b_{N-1}\}$, $\{c_0, c_1, \ldots, c_{N-1}\}$ with $N \approx 10$, with the lower and upper sums are determined as follows:

distribution module 508a calculates for histogram 422a having bins $\{b_0, b_1, \ldots, b_{N-1}\}$:

$$S_L^{\hat{x}(t)} = h_1, S_U^{\hat{x}(t)} = \Sigma_{i=2}^{N-1} h_i,$$

and distribution module 508b calculates for histogram 422b having bins $\{c_0, c_1, \ldots, c_{N-1}\}$:

$$S_L^{\hat{y}(t)} = g_1, S_U^{\hat{y}(t)} = \Sigma_{i=2}^{N-1} g_i.$$

The first and second weight parameters ($R_{\hat{x}(t)}$ and $R_{\hat{y}(t)}$ respectively), which are ratios between the upper and lower sums for the far-end signal histogram 422a and microphone signal histogram 422b respectively in this embodiment, are then calculated by the first and second distribution modules 508a, 508b respectively as follows:

508a calculates:

$$R_{\hat{x}(t)} = \frac{S_U^{\hat{x}(t)}}{S_L^{\hat{x}(t)}};$$

508b calculates:

$$R_{\hat{y}(t)} = \frac{S_U^{\hat{y}(t)}}{S_L^{\hat{y}(t)}}.$$

Each of first and second parameters is a measure for that histogram of upper weight in the histogram compared to lower weight in that histogram. A high value of R indicates a flatter distribution, which suggests that compression has been applied to that signal. Thus, a detected condition of $R_{\hat{y}(t)}$ (microphone signal parameter) being substantially greater $R_{\hat{x}(t)}$ (far-end signal parameter) indicates that nonlinear compression has been applied by the audio signal processing module 209, whereas a detected condition of $R_{\hat{y}(t)}$ and $R_{\hat{x}(t)}$ being substantially the same indicates that no nonlinear amplitude processing has been applied in the echo path.

The compression detection module 510 block is configured to detect compression by the audio signal processing module 209 by comparing $R_{\hat{y}(t)}$ and $R_{\hat{x}(t)}$ and to output a binary-valued signal $C \in \{0,1\}$ to the echo cancellation module 310 (with C=1 effecting more aggressive echo cancellation by the echo cancelation module than C=0).

A simple comparison may be implemented by the detection module 510 calculating an inter-distribution compaction parameter $T = R_{\hat{y}(t)} / R_{\hat{x}(t)}$ and determining the output C as $$C = \begin{cases} 1 \text{ if } T > T_0 \\ 0 \text{ if } T \le T_0 \end{cases} \text{ with } T \ge 1 \text{ and } T \approx 1$$

However, for values of T close to $T_0$, this may result in unwanted oscillation in (i.e. unduly rapid fluctuations) of the output C. Therefore, in some embodiments, hysteresis is introduces by the detecting module 510 determining the output C to the echo cancellation module 310 according to a switching scheme as follows:

for C=0, C→1 if T>$T_{upper}$; for C=1, C→0 if T<$T_{lower}$; $T_{upper}$>$T_{lower}$.

That is, a switching scheme whereby the output C switches from a lower state to a higher state when the inter-distribution comparison parameter T rises above an upper threshold and whereby C switches from a higher state to a lower state when the inter-distribution parameter T falls below a lower threshold, the higher threshold being greater than (and not equal to) the lower threshold.

Values for $T_{upper}$ and $T_{lower}$ can be determined by tuning Values of $T_{upper}$=1.5 and $T_{lower}$=1.2 are expected to be reasonable.

In this embodiment, C is a binary-valued output (i.e. 0 or 1). Responsive to a received signal corresponding to C=0 (resp. C=1), the echo cancellation module 310 is operable to apply more aggressive (resp. less aggressive) echo cancellation (discussed above).

In the embodiments described above, an acoustic system (i.e. the communication system 100) comprises just two user devices. However it will be appreciated that the methods described herein can be applied in acoustic systems comprising more than two user devices.

In alternative embodiments, as will be apparent (and as discussed above), non-binary values of C could be used to implement further levels of increasingly aggressive echo cancellation, becoming increasing more aggressive as more extreme compression is detected (as indicated by increasing disparities between histograms 422a and 422b).

The compression detection only runs when far-end activity is detected. A Voice Activity Detector (VAD) (not shown) runs on the far-end signal so that the histograms are only calculated during periods of far-end activity. Further, "clean echo" (i.e. no near-end activity) is desirable for the histogram calculations (if near-end is speaking at the same time, that creates double talk which may negatively impact on the detection). Thus a VAD may also run on the microphone signal y(t), with compression detection only being performed during periods when there is both far-end activity and no near-end activity.

Further, whilst in the above a respective parameter of each distribution 422a/422b is determined for each by comparing a lower portion of that distribution to an upper portion of that same distribution, alternative parameters could be used. For instance, histograms 422a and 422b could be compared by determining a location of a percentile (e.g. $95^{th}$ percentile) for each. A higher value percentile again indicates a more evenly distributed histogram (as caused by dynamic compression). In this case, the condition indicative of nonlinear amplitude processing in the echo path may be a substantial difference between the respective values of that percentile (e.g. $95^{th}$ percentile) for each of the histograms 422a, 422b (in contrast, histograms 522a and 522b having substantially similar values of that percentile, e.g. $95^{th}$ percentile, indicates that no such compression is present in the echo path). Other measured such as variance (a measure of spread) and kurtosis (a measure of peakedness) etc. could also be employed in a manner that will be apparent.

Further, rather than being based on a comparison of signals, compression detection may instead be based on e.g. a control signal output from the audio signal processing module 209, that module being configured to provide the control signal which is indicative of whether or not that module is performing nonlinear amplitude processing on its input.

Further, whilst in the above nonlinear amplitude processing in an echo path is detected, the compression detection process may be employed in other contexts e.g. with pre-recorded first and second signals, the second being a processed version of the first. Both may be stored on a computer readable medium as audio and received by reading that audio data from the computer readable medium.

Further, whilst in the above first (e.g. far-end) and second (e.g. microphone) signal portions are normalized prior to comparison thereof, this may not be necessary (i.e. no amplitude scaling may be required) e.g. if it is known that the first and second signals have substantially equal peak amplitudes or if it detected that they have substantially equal peak amplitudes. Or alternatively, in embodiments, only one of said signals may be normalized, that signal being normalized to a peak amplitude of the other signal (such that both have the same peak amplitude after normalizing said one signal).

Further, whilst in the above, amplitude distributions are compared by comparing parameters thereof, alternatively amplitude distributions (e.g. histograms) could be compared directly without determining any parameters (ratios, percentiles etc.). For instance, two histograms could be compared bin by bin and a decision made based on those differences. Comparing audio signals directly without amplitude distributions (e.g. by subtraction in the time domain) is conceivable, but would require synchronisation of time-domain samples on a sample-by-sample basis.

In the embodiments described above, the echo removal is implemented in a VoIP system (e.g. the received audio signal may include speech of the user 102 for transmission to the user device 110 during a call between the users 102 and 108 over the communication system 100). However, the methods described herein can be applied in any suitable system in which echo cancellation is to be applied.

The methods described herein may be implemented by executing a computer program product (e.g. the client 206) at the user device 104. That is, a computer program product may be configured to reduce noise in an acoustic system comprising the user device 104 and at least one further user device wherein the computer program product is embodied on a computer-readable storage medium (e.g. stored in the memory 214) and configured so as when executed on the CPU 202 of the device 104 to perform the operations of any of the methods described herein.

Generally, any of the functions described herein (e.g. the functional modules shown in FIG. 3 and the functional steps shown in FIG. 4) can be implemented using software, firmware, hardware (e.g., fixed logic circuitry), or a combination of these implementations. The modules and steps shown separately in FIGS. 3 and 4 may or may not be implemented as separate modules or steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer system comprising:
   an audio processing module configured to process an audio signal and output the processed audio signal to an audio output device of the system;
   an echo cancellation module configured to cancel echo from a received audio signal received via an audio input device of the system; and
   a control module configured to detect a degree of nonlinear amplitude processing by the audio processing module and control said echo cancellation by applying more or less aggressive echo cancellation settings by the echo cancellation module based on the detected degree.

2. A computer system according to claim 1, wherein said control module is configured to, for each of the audio signal and the received audio signal, determine a parameter of an amplitude distribution for that audio signal, said detection comprising comparing the determined parameters for each distribution.

3. A computer system according to claim 2, wherein said control module is configured to determine said distributions over a range of values corresponding to signal amplitudes of the respective signals.

4. A computer system according to claim 3, wherein said values are magnitudes of the respective signal amplitudes, the control module being operable to calculate said magnitudes.

5. A computer system according to claim 2, wherein said distributions are histograms for the respective audio signals.

6. A computer system according to claim 5, wherein each of said histograms for the respective audio signals comprises a plurality of bins, each bin being a range of magnitudes of signal amplitudes of that audio signal.

7. A computer system according to claim 6, wherein each of said histograms has a first bin, a second bin for amplitude values greater than the first bin, and at least a third bin for amplitude values greater than the second bin, and determining each of said distribution parameters comprises, for each of said histograms, comparing the second bin of that histogram to at least the third bin of that histogram.

8. A computer system according to claim 2, wherein determining each of said respective distribution parameters for the respective distributions comprises determining a weight parameter by comparing an upper portion of that distribution to a lower portion of that distribution, said detection comprising comparing the determined weight parameters for the respective distributions.

9. A computer system according to claim 2, wherein determining each of said respective distribution parameters for the respective distributions comprises determining a percentile for that distribution, said detection comprising comparing the determined percentiles for the respective distributions.

10. A computer system according to claim 2 further comprising a modelling module configured to calculate a linear model of an echo path of the received signal, said echo cancellation by the echo cancellation module being based on the linear model.

11. A computer system according to claim 2, wherein the control module is configured to control the echo cancellation module to prevent echo leaks due to nonlinearities in an echo path of the received signal introduced by said nonlinear amplitude processing by the audio processing module.

12. A computer system according to claim 1, wherein the control module is configured to determine respective histograms for values corresponding to respective signal amplitudes of the audio signal and the received audio signal respectively, said detection comprising comparing those histograms.

13. A computer system according to claim 1, wherein said detection comprises comparing the audio signal and the received audio signal.

14. A computer system according to claim 1, wherein the control module is configured to normalize one or more of the audio signal and the received audio signal, said detection being based on the normalized audio signals.

15. A computer system according to claim 14, wherein said control module is configured to, for each of the audio signal and the received audio signal, determine a parameter of an amplitude distribution for that audio signal, said detection comprising comparing the determined parameters for each distribution, wherein said distributions are distributions for the respective normalized signals.

16. A computer system according to claim 1, wherein said nonlinear amplitude processing by the audio processing module comprises dynamic range compression.

17. At least one computer readable storage medium storing code which, when executed on one or more processors of a computer system comprising an audio processing module configured to process an audio signal and output the processed audio signal to an audio output device of the system, causes the one or more processors to:
   cancel echo from a received audio signal received via an audio input device of the system;
   detect a degree of nonlinear amplitude processing by the audio processing module; and
   control said echo cancellation more or less aggressively based on the detected degree, more aggressive echo cancellation being applied when the detected degree is higher and less aggressive echo cancellation being applied when the detected degree is lower.

18. At least one computer readable storage medium according to claim 17, wherein said code further causes the one or more processors to, for each of the audio signal and the received audio signal, determine a parameter of an amplitude distribution for that audio signal, said detection comprising comparing the determined parameters for each distribution.

19. A computer device comprising:
one or more processors configured to:
for each of first and second audio signals, the second audio signal being a processed version of the first audio signal, determine a parameter of an amplitude distribution for that audio signal; and
detect a degree of said processing of the first signal comprising nonlinear amplitude processing, said detection comprising comparing the determined parameters for the first and second signals; and
apply more or less aggressive echo cancellation based on the detected degree.

20. A computer device according to claim 19, wherein one or more processors are further configured to determine histograms for values corresponding to respective signal amplitudes of the first audio signal and the second audio signal respectively, said parameters being respective parameters of those histograms.

* * * * *